Oct. 7, 1952   T. O. MATHUES   2,612,655
METHOD AND APPARATUS FOR EXTRUDING RUBBERLIKE MATERIAL
Filed Nov. 4, 1948
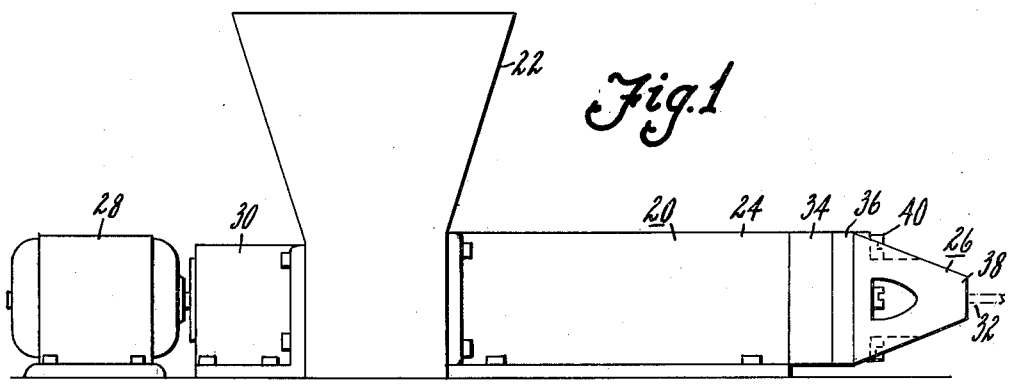
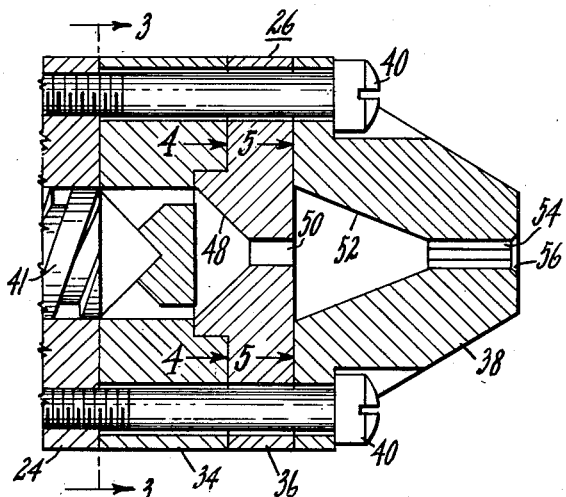
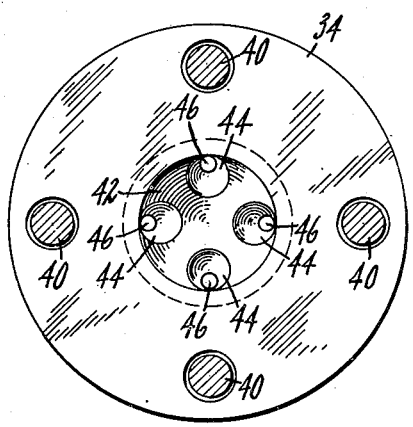
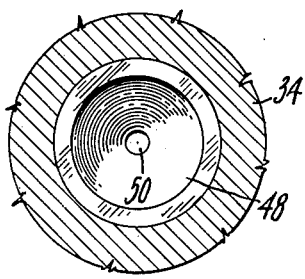
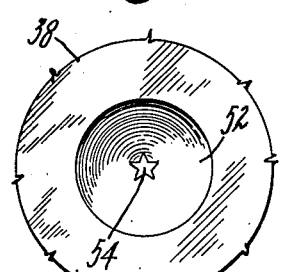
INVENTOR.
THOMAS O. MATHUES
BY
HIS ATTORNEYS Patented Oct. 7, 1952

2,612,655

UNITED STATES PATENT OFFICE 2,612,655

METHOD AND APPARATUS FOR EXTRUDING RUBBERLIKE MATERIAL

Thomas O. Mathues, Dayton, Ohio, assignor to General Motors Corporation, Detroit, Mich., a corporation of Delaware Application November 4, 1948, Serial No. 58,208

3 Claims. (Cl. 18—12)

This invention relates to extrusion machines and method of extruding rubber-like materials and is particularly concerned with apparatus and methods for extruding crumb stock.

It is further the basic object of the invention to provide a method and machine for extruding crumb stock directly without any preliminary warming up of the crumb or otherwise plasticizing the same prior to its use in the machine.

In carrying out the above object, it is a further object to provide an extrusion die consisting of a plurality of nozzles, the first of which comprises a plurality of apertures of relatively small size, preferably spaced adjacent the outer periphery of the nozzle so that the crumb stock as it is fed through the nozzle by action of the extruder screw, is broken up into a plurality of small streams or threads. The output of this first nozzle is led through a tapered bore into another nozzle which, preferably, is of less cross sectional area than the total cross sectional area of the plurality of apertures in the first nozzle. As the threads of extruded crumb pass from the first nozzle into the tapered bore, they are mechanically worked and thereby plasticized and, after passing through the second nozzle, are integrated into a single stream or thread which is of good strength upon curing and consists of a satisfactorily extruded shape. If the shape of the extruded article is at all complicated in its cross section, it is desirable to provide a third nozzle which carries this desired configuration. This third nozzle also has a tapered bore leading into the ingress end thereof and the cross sectional area of the nozzle per se which carries the configuration of the cross section of the extruded article is preferably of slightly less area than the area of the preceding nozzle.

A still further object of the invention is to provide a method for mechanically plasticizing and working crumb stock in an extrusion head whereby an extruded length of rubber-like material may be produced without warming up the crumb prior to its introduction in the extruder.

Further objects and advantages of the present invention will be apparent from the following description, reference being had to the accompanying drawing, wherein preferred embodiments of the present invention are clearly shown.

In the drawing:

Fig. 1 is a diagrammatic view of an extruding machine.

Fig. 2 is a view in cross section of an extrusion head for said machine.

Fig. 3 is a view taken on line 3—3 of Fig. 2.

Fig. 4 is a view taken on line 4—4 of Fig. 2.

Fig. 5 is a view taken on line 5—5 of Fig. 2.

The use of rubber-like crumb stock has become increasingly important since the introduction of synthetic copolymers. Rubber-like copolymers may be made in crumb form quite easily. This form of stock presents a highly satisfactory material from a handling standpoint, the stock is dry and free flowing and may be shoveled or conveyed from one point to another, thereby obviating past difficulties in the use of rubber-like material wherein slabs and/or sheets must necessarily be conveyed.

Butadiene-styrene copolymers, butadiene-acrylonitrile copolymers and polymers of other compounds containing a single ethylenic double bond $>C=C<$ which are copolymerizable with butadiene-1,3, hydrocarbons in aqueous suspensions all may be used. Also any other rubber or rubber-like material that will form a crumb of satisfactory nature. This crumb has never before been of a satisfactory nature for use in extrusion machines. The difficulties experienced are manifold. First, difficulty is experienced in conveying the crumb within the screw of the machine. This has been eliminated to a large extent by changing the design of the screw and the hopper or by using a tamper. However, even when the machine is made to feed the crumb satisfactorily, the output of the extrusion die or head is of a crumby nature and has very low tensile strength and in many instances, breaks off as it comes from the die. Thus, in order to make satisfactory extruded articles, it has been necessary in the past to warm up the crumb rubber by mechanically pre-working the stock on hot rolls or in a kneading machine. This obviously is an expensive procedure and to some extent, nullifies the other advantages in the use of crumb stock.

I have found that through a unique design of an extrusion die to be used on an extrusion machine, or tuber as it is often called, that the difficulties heretofore experienced may be eliminated in their entirety and that crumb stock may be fed directly to the hopper of the tuber and extruded from the die end thereof in long lengths of highly desirable material having tensile strength approximating and/or equal to the strength of extruded milled rubber-like material.

I have found that this die design is critical and must be followed rather closely in order to obtain satisfactory results. To more fully explain my invention, reference to the drawings will be made, wherein Fig. 1 shows a tuber or extrusion machine at 20 including a feed hopper 22, a screw housing 24 and an extrusion head 26. The machine is driven by a motor 28 through a gear box 30. Crumb stock fed into the hopper will be conveyed through the screw housing 24 to the head or die 26 whence it will emerge in the form of a tube, rod, etc., at 32.

Explaining the unique design of the extrusion head or die more fully, it will be seen that in Fig. 2 the die 26 comprises three main sections 34, 36 and 38 held to the housing 24 by a plurality of bolts 40. A screw within the housing 24 is shown at 41 and this acts as the conveying means for the crumb from the hopper 22.

The die part 34 is shown in plan view in Fig. 3 wherein the main face of the part 34 is undercut by means of a drill ground to a substantially right angle as at 42. This tapered bore is further undercut as at 44 by smaller drills and then each of these undercut portions is provided with an aperture 46 which passes completely through the part 34. In the embodiment shown in Fig. 3, four of such apertures are provided. It is to be understood that more of said apertures may be used if desired and that the number may even be reduced to two in some cases, although three or more are preferred for reasons to be discussed hereinafter.

The outlets of the apertures 46 feed into a tapered bore 48 in part 36 which acts as the inlet for an aperture 50 therethrough. The aperture 50 is preferably of a size slightly less in cross sectional area than the total cross sectional areas of all the apertures 46. In this manner, the output of the apertures 46 is fed into the bore 48 and is compressed slightly as it is mechanically worked through high turbulence, thereby introducing heat into the operation. During this step, the velocity of the extruded material is increased to cause additional heating effect.

It has been found that the output of the aperture 50 is a satisfactory extruded article having good tensile strength and satisfactory finish. In some instances, however, where the cross section of the extruded shape is more or less complicated in configuration, it may be desirable to add a third die part 38 which also includes a tapered inlet bore 52 and a properly shaped aperture 54, which aperture 54 includes the final shape of the desired article in cross section. Aperture 54 is preferably chamfered at its outlet as at 56 and here again, the cross sectional area of the aperture 54 is preferably slightly less than that of aperture 50 to create a build-up of pressure within the bore 52, thereby adding still further heat through mechanical work due to the turbulence of the material being passed therethrough.

The principle behind the operation of this tubing die, as it may be termed, rests in the mechanical work introduced into the material due to being broken up into a plurality of small streams which are fed inwardly to a central point and are placed under a degree of compression for introducing heat. Thus, the tubing die 26 acts in a degree the same way as the milling operation previously used in the art. In other words, the mechanical working and warming up of the crumb stock is accomplished directly within the die, thereby eliminating the necessity of external operations.

It will be noted that in die part 34 the three or more holes or apertures 46 which are used in the original breaking up of the crumb stock are spaced adjacent the outer periphery of the die part and feed into a tapered portion whereby the separate streams are turbulently worked, being caused to fold over one another under compression prior to passage through the next aperture as at 50. It is apparent here that if only two apertures 46 are used that similar results may be obtained by using another die portion 36 which is drilled for two apertures at right angles to those in the first die part and then adding a third die within a single aperture therein. In other words, any number of variations of the principle may be used to accomplish the same end, the basic principle behind the whole operation being to break up the crumb into a plurality of small streams of rubber-like material and to take these small streams and fold them over one upon the other in a turbulent manner for causing mechanical working of the stock together with the generation of heat after which the mechanically worked and heated stock is passed through the extrusion die to form a final shape. This principle is the basis of my invention. It must also be noted that the apertures at 46 must be out of line with aperture 50 so that the streams of the rubber-like material are caused to change in direction during progress through the die 26. Otherwise the moving material will pass through in a stream from one die part to the next without any mechanical work and a large slug of inactive material will be present in all other portions of the die. In this instance, it will be found that the output of the final die will not have any strength. In fact, this very action is apparent when using a strainer in the tuber and passing the output of the strainer into an extrusion die. In this instance, only that portion of material in direct line with the die moves through the strainer and the remainder thereof stays inactive within the extrusion head. This is the peculiarity that is inherent in crumb when being forced through a die by means of a screw or other pressure feed. It is apparent from the design of my improved head that all material within the die must move since it is constantly being broken up and directed to a different point which is out of line with the output end of the preceding die part, thereby eliminating any dead portions within the charge.

I have found that the balance between the cross sectional area of the apertures in part 34 and part 36 are not of any great importance, although the aperture in part 36 is preferably no greater in cross sectional area than the total cross sectional areas of the apertures in part 34 and preferably should be slightly less to cause a back pressure which creates additional heat. The use of the head or die 38, as previously mentioned, is not entirely necessary unless a complicated configuration of the article is desired and even in this case, it may be eliminated in many instances. This had best be arrived at by trial.

The exact size of aperture 50 with respect to aperture 46 is also best arrived at by trial. When extruding or tubing a butadiene-styrene copolymer compound, it was found that the cross sectional area of the aperture 50 to give best results, should be exactly one-half the area of the total cross sectional area of apertures 46. However, as the formula changes, satisfactory results may be obtained with other area evaluations and, for that matter, even with the aforementioned stock satisfactory extruded shapes were made wherein the aperture 50 was but slightly less, for example, 5% less than the total area of the apertures 46.

From the foregoing it is manifest that I have provided a new method and apparatus for tubing or extruding crumb stock directly without any warm up work therein external of the tuber. It is to be understood that any crumb stock of rubber-like nature may be satisfactorily extruded by this method and in this apparatus, providing such crumb stock can be extruded in conventional apparatus after a warm-up. Therefore, the method and apparatus is in no way limited to the use of any specific type of rubber or synthetic rubber or plastic material but is useful with any crumb stock that may be plasticized through mechanical work and heat to form a thermally workable material that may be extruded through a die.

It is apparent that a single feed device may be used to supply more than one extrusion head. In this case, the output of the first, or breakup, die can be divided and integrated by two or more finish dies. Also, several breakup dies may be used, one for each finish die. In all cases, the principle of breaking up the crumb into a plurality of small streams, changing the direction of flow of said streams and then integrating the streams into a single stream is maintained.

Also, although the orifices shown are substantially round, it is manifest that any geometrical design of outlet may be used in the various dies providing the other factors are maintained.

This apparatus and method is also applicable to mill mixed stock wherein the stock may be extruded without warm-up which is required under usual extrusion procedures. Also, the mill stock can be used in ribbons, shreds, or any other form.

While the embodiments of the present invention as herein disclosed, constitute preferred forms, it is to be understood that other forms might be adopted.

What is claimed is as follows:

1. Apparatus for extruding rubber-like crumb stock, comprising in combination; a tubular having a pressure feed screw, a tandem die adapted to receive the crumb stock under pressure from said feed device, said die consisting of at least two portions, the first of which includes at least three orifices of relatively small size radially spaced, said orifices being disposed circumferentially and substantially tangent to a circle defined by the outer diameter of the screw, and the second portion of which consists of a tapered inlet having a throat opening connecting with the outlets of said orifices in the first portion and tapering down to a single opening therethrough which is substantially centrally located and out of line with respect to any of the orifices in the first portion and which has a cross sectional area at least 5% less than the total cross sectional area of the orifices in the said first portion, whereby stock passing through the orifices in the first portion is broken up into small streams which are folded and worked into a single stream which passes through the final orifice.

2. Apparatus for extruding rubber-like crumb stock, comprising in combination; a tuber having a pressure feed screw for feeding crumb stock therethrough, and a tandem die disposed at the outlet end of said tuber and adapted to receive said crumb stock under pressure, said tandem die consisting of at least two portions, the first of which includes at least three orifices radially spaced, said orifices being disposed circumferentially and substantially tangent to a circle defined by the outer diameter of the screw, and the second portion of which includes a tapered bore leading from said first portion orifices to a substantially centrally located single orifice and out of line with respect to any of the orifices in the first portion wherein the cross sectional area of said centrally located orifice is approximately one-half the total cross sectional area of the orifices in the said first die portion.

3. In the method of extruding rubber-like crumb stock, the steps consisting of; conveying cold crumb stock under high pressure by means of a screw directly to an extrusion head in a single stream, breaking said stream of crumb stock into at least three relatively small streams of material said streams being radially spaced and circumferentially disposed so as to be substantially tangent to a circle defined by the outer diameter of said screw, plasticizing the stock in said small streams by causing the same to be heated through folding by changing the direction of flow of said streams toward a common center whereby high turbulence is created, integrating the small streams into a single stream wherein the cross sectional area of said single stream is at least 5% less than the total cross sectional area of said relatively small streams whereby the stock is extruded under high pressure into a well integrated mass.

THOMAS O. MATHUES.

REFERENCES CITED

The following references are of record in the file of this patent:

UNITED STATES PATENTS

| Number | Name | Date |
| --- | --- | --- |
| 1,618,026 | Royle | Feb. 15, 1927 |
| 1,768,671 | Devine | July 1, 1930 |
| 2,332,829 | Parsons et al. | Oct. 26, 1943 |